United States Patent [19]

Bigott

[11] Patent Number: 5,379,884

[45] Date of Patent: Jan. 10, 1995

[54] PAGER BACK-UP BATTERY HOLDER

[76] Inventor: Jeffry J. Bigott, 1972 Rollins Ct., Naperville, Ill. 60565

[21] Appl. No.: 198,850

[22] Filed: Feb. 18, 1994

[51] Int. Cl.⁶ .................. B65D 85/38; A45G 11/00; A45F 5/00
[52] U.S. Cl. ..................... 206/37; 206/38; 224/252
[58] Field of Search ............... 206/37, 38; 224/252

[56] References Cited

U.S. PATENT DOCUMENTS

| | | |
|---|---|---|
| D. 165,360 | 12/1951 | Brettner . |
| 1,496,474 | 6/1924 | Lloyd . |
| 2,250,782 | 7/1941 | Tapie . |
| 2,304,367 | 12/1942 | Meyer .............................. 224/902 X |
| 2,400,626 | 5/1946 | Brede .............................. 206/333 X |
| 2,493,205 | 1/1950 | Muldoon .......................... 362/207 X |
| 2,822,848 | 2/1958 | Thoms . |
| 3,091,378 | 5/1963 | O'Dwyer ............................. 224/252 |
| 3,716,131 | 2/1973 | Ackerman . |
| 3,885,148 | 5/1975 | Di Benedetto ................ 362/207 X |
| 4,641,370 | 2/1987 | Oyamada . |
| 4,702,975 | 10/1987 | Fields . |
| 4,896,805 | 1/1990 | Klaczak et al. . |
| 4,951,817 | 8/1990 | Barletta et al. . |
| 5,002,214 | 3/1991 | Caranci ................................ 224/252 |
| 5,081,709 | 1/1992 | Benyo et al. . |
| 5,188,450 | 2/1993 | Anderson ........................ 206/573 X |
| 5,210,532 | 5/1993 | Knoedler et al. .............. 224/252 X |
| 5,226,722 | 7/1993 | Maglica ............................... 362/207 |

Primary Examiner—William I. Price
Attorney, Agent, or Firm—Richard G. Kinney

[57] ABSTRACT

A spare or back-up battery holder for a conventional pager or beeper made of rubber-like sheeting formed into a rectilinear sleeve that fits closely over and surrounds the bottom side walls of the pager, which sleeve extends below the bottom of the pager and is closed off at its bottom to form a pouch or pocket for holding the spare battery. The flexible and elastic nature of the holder allows for easy manual attachment and removal from a pager and easy "squeezing" freeing of the spare battery from the pouch after removal. The attachment to the pager is sufficient to prevent or reduce the likelihood of accidental removal of the holder and the holder is sized to accommodate one or two spare batteries.

11 Claims, 2 Drawing Sheets

PAGER BACK-UP BATTERY HOLDER

SPECIFICATION

FIELD OF THE INVENTION

The present invention relates to a holder for storing a spare or back-up battery in conjunction with a battery-powered pager or beeper device.

BACKGROUND OF THE INVENTION

There is a need for a replacement spare or back-up battery to be carried along with a pager or beeper. Failure of the primary battery in a beeper or pager can result in the unit not operating. Since beepers or pagers are often used by emergency personnel, such as medical doctors, hospital personnel, volunteer firemen, and policemen, the failure of a pager to operate may result in great harm or danger. Even among non-emergency-personnel users of pagers, such as outside salesmen and repair personnel, the failure of a pager due to a depleted battery can be costly in lost orders, customer ill will, and inefficient use of their time.

There have been a number of spare battery holders suggested in the past. U.S. Pat. No. 4,702,975 to Roy Fields suggests a spring clip-on spare battery holder for a pager. This device is relatively complex involving several parts and holds spare batteries in an exposed position, where they can be easily knocked free by an accidental striking of an object by a user wearing a pager equipped with the unit on his or her belt. U.S. Pat. No. 4,951,817 suggests a cover with a spare battery holder consisting of an elastic loop pouch at the front lower edge of the cover. This location makes the combined unit thicker than may be convenient for shirt pocket use and also allows for accidental loss of the spare battery when belt worn and, if used in a shirt pocket with the battery on the inside, would be uncomfortable to carry or, if used with the battery projecting outward, would provide an unsightly bulge in the pocket.

Thus, there still exists a need for a simple and easy-to-use spare battery holder that is comfortable to carry with a pager and which prevents or reduces the chance that the spare battery will be accidentally knocked free and lost.

SUMMARY OF THE INVENTION

To overcome one or more of the drawbacks of previous battery holders for a beeper or pager device, the present invention provides a holder for a standard such device, which holder is constructed in a unitary manner of sheet rubber or rubber-like material formed into a sleeve open at one end and sized and shaped to fit against and about the bottom side walls of the pager's housing. The sleeve extends below the pager's housing and defines a pouch or pocket for receiving a spare or back-up battery held lengthwise adjacent the bottom surface of the pager's housing.

The elastic material is releasably but firmly attached to the housing and resists accidental removal. The extremely flexible nature of the holder allows the battery to be easily removed or "squeezed" out of the sleeve and also allows for easy manual fitting onto and off of the pager housing.

The invention, together with further advantages and features thereof, may best be understood by reference to the following description, taken in connection with the accompanying drawings, in the several figures of which like reference numerals identify like elements.

DETAILED DESCRIPTION OF ONE PREFERRED EMBODIMENT

Figure 1:
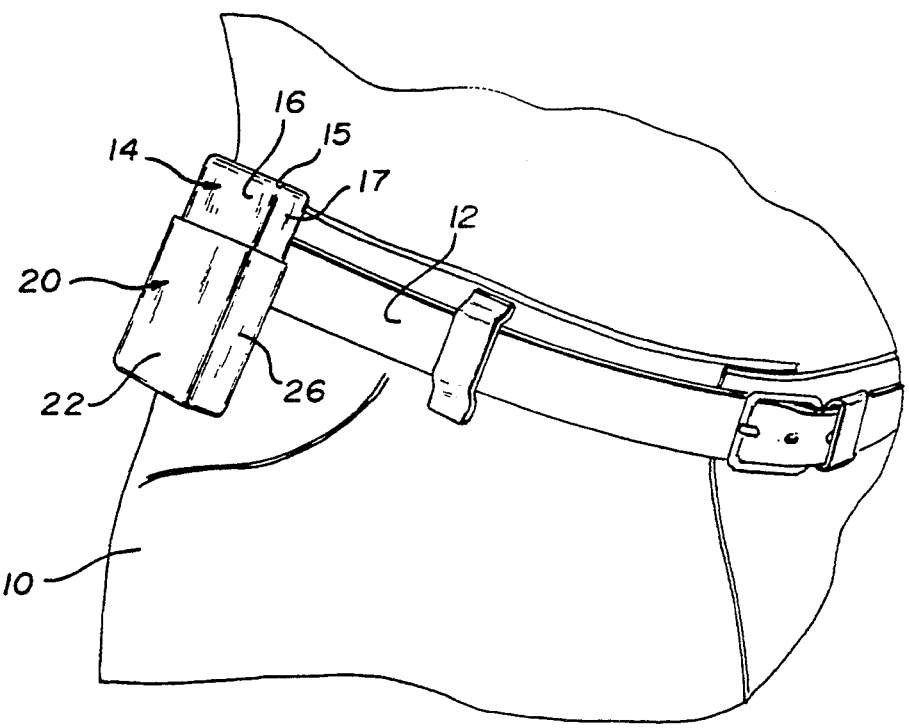
FIG. 1 is a partial perspective view of a user of a pager or beeper device, showing the device worn on the user's belt and a spare or back-up battery holder constructed in accordance with the principles of the present invention attached to the pager device.

Referring to the figures and initially FIG. 1, there is depicted a person 10 wearing a belt 12 on which is worn a more-or-less conventional pager or beeper device 14 which has a spare or backup battery holder 20 which is constructed in accordance with the principles of the present invention.

The holder 20 is made of a rubber-like material so as to be extremely flexible and resilient, although other materials may be employed. One suitable and presently preferred material is silicone/rubber made by Parco of 2150 Parco Avenue, Ontario, Canada, and termed by them Compound 4900-50.

Figure 2:
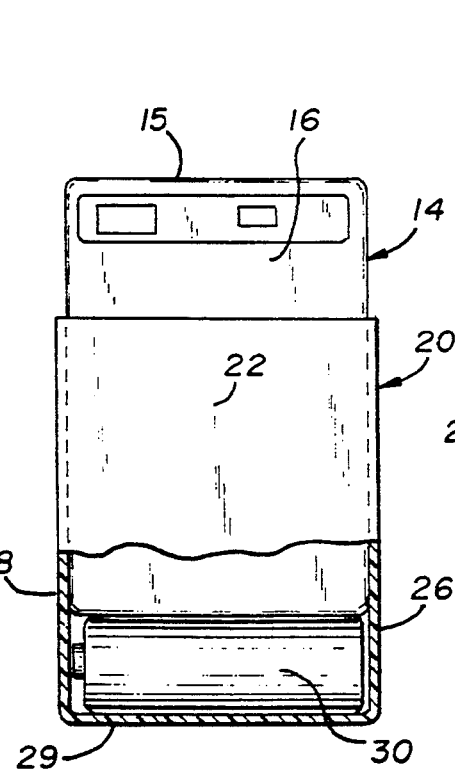
FIG. 2 is a left side elevational view of the pager device and back-up battery holder of FIG. 1, with a portion of the holder shown broken away to show a carried spare battery.

The pager 14 has a generally rectilinear housing with a generally rectangular top 15, front 16, left side 17 and, as shown in FIG. 2, a generally rectangular right side 18 and a rear surface 19 to which a belt or pocket clip 13 is affixed. The pager 14 also includes a bottom housing wall 11 of a generally rectilinear shape.

Figure 3:
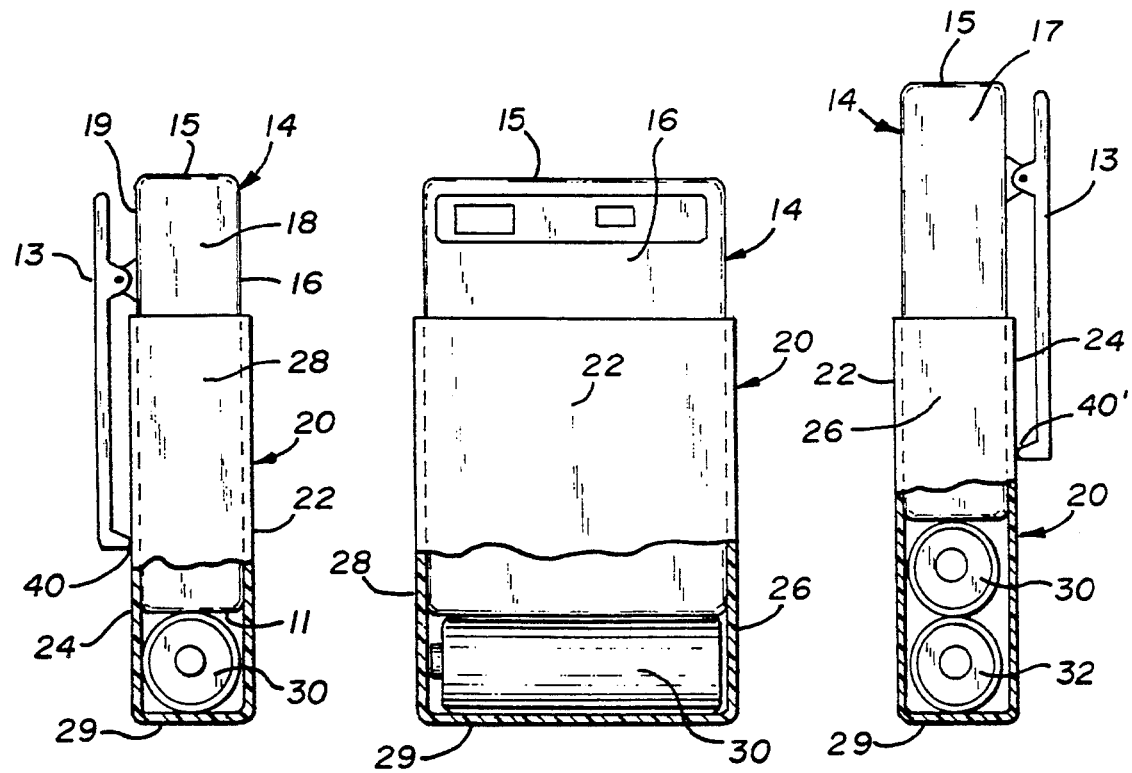
FIG. 3 is a front elevational view of the pager device and holder of FIGS. 1 and 2, with a portion of the holder broken away to show interior parts.

As mentioned, the pager 14 may be entirely conventional. For example, it may be a Motorola Bravo Model No. 636617, manufactured by the Motorola Corporation of Schaumburg, Ill. Such units are compact and have a digital display and user controls at or near the top of their housing. The size of this unit is approximately $2.875 \times 1.90625 \times 0.6875$ inches. The bottom wall 11 is approximately $1.90625 \times 0.6875$ inch or slightly larger than the size of the AA spare battery 30 received in the pager device 14 as illustrated in FIGS. 2 and 3.

The holder 20 is constructed of sheet-like material in a rectangular cross-section sleeve-like shape with generally rectangular front and rear walls 22, 24 and side walls 26, 28 and a bottom wall 29 closing one end of the sleeve. The size and shape of the upper portion of the holder 20 is sized and shaped to conform to the outside of the lower portion of the housing of the pager 14. That is, the relaxed inside dimensions of the holder 20 are 1.845 and 0.745 inch. The inside size of the holder 20 is slightly less than that of the housing of the pager device 14, so that the holder is stretched slightly when encircling the pager and held to it like a stretched rubber band as well as by friction.

The overall outside dimension of a preferred embodiment of a holder to fit the aforementioned Motorola pager is approximately 2.6 inches tall, 1.9 inches wide, and 0.8 inch deep.

Figure 4:
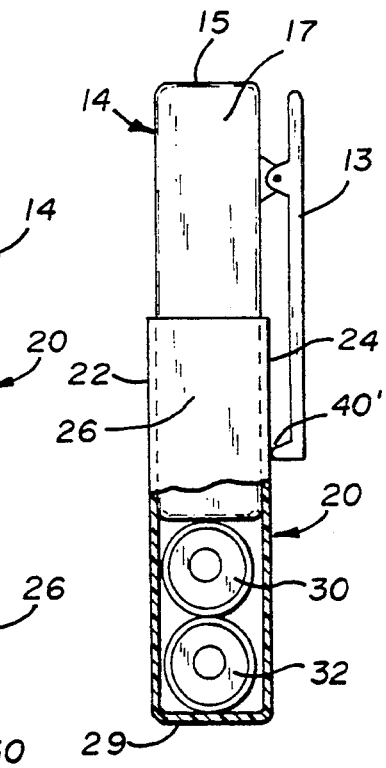
FIG. 4 is a fight side elevational view of the pager device and holder of FIGS. 1–3 but in use with two rather than one spare battery and with a portion of the holder broken away to show the two spare batteries.

The holder 20 is also held by the friction and pressure contact at 40 or 40' of the pager's clip 14 against the back wall 24 of the holder, as shown in FIG. 2 and FIG. 4.

The holder 20 is held sufficiently by friction and pressure to allow one battery 30 (FIG. 2) or even two batteries 30, 32 (FIG. 4) to be held in it. Note that, since the battery 30 or 34 is entirely enclosed by the holder and bottom 11 of the pager, it cannot be knocked out by an inadvertent hit, as can, e.g., the battery of the aforementioned U.S. Pat. No. 4,702,975. Note also that the back-up batteries do not project outward from the front or rear walls 16 and 19 of the pager device 14, so that they do not form a bulge that can press into the user's body or be accidentally hit during wear.

The walls of the holder 20 are preferably of about 0.055 inch in thickness, which adds only 0.11 inch to the overall width of the pager. This, plus the rubber-like resiliency of the material silicone/rubber, provides protection against hits and prevents scratches and nicks to the pager housing. While shown plain, the outer wall 22 can also be used to display an advertising logo and to that end a raised boss may be encorporated in it.

Figure 5:
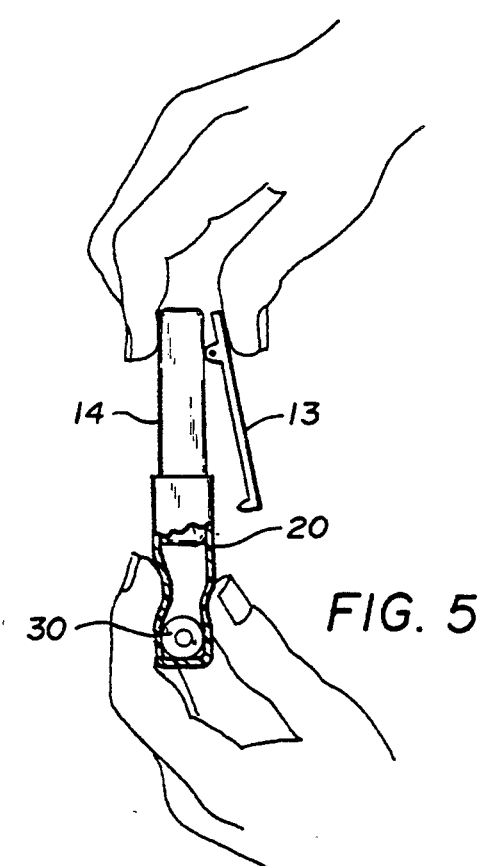
FIG. 5 is a perspective view of the pager device and holder of FIGS. 1–4, with a single battery and part of the holder broken away to show the battery, the holder and pager device being shown in the hands of a user who is in the process of removing the holder and battery from the pager device.
Figure 6:
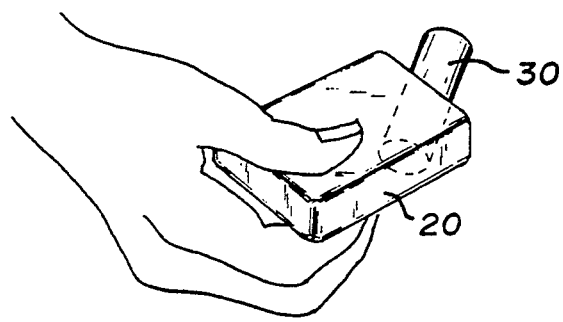
FIG. 6 is a perspective view of the back of a user "squeezing" the spare battery out of the holder of FIGS. 1–5.

Referring to FIG. 5, the ease of removal of the holder is there illustrated, as the user need only grab the bottom of the holder and thus through its flexible walls grip the battery 30 and pull downward while depressing the clips 13 as shown. Once the holder 14 and its battery are free of the pager device 14, the battery 30 can be easily squeezed out of the holder 20 as shown in FIG. 6.

Figure 7:
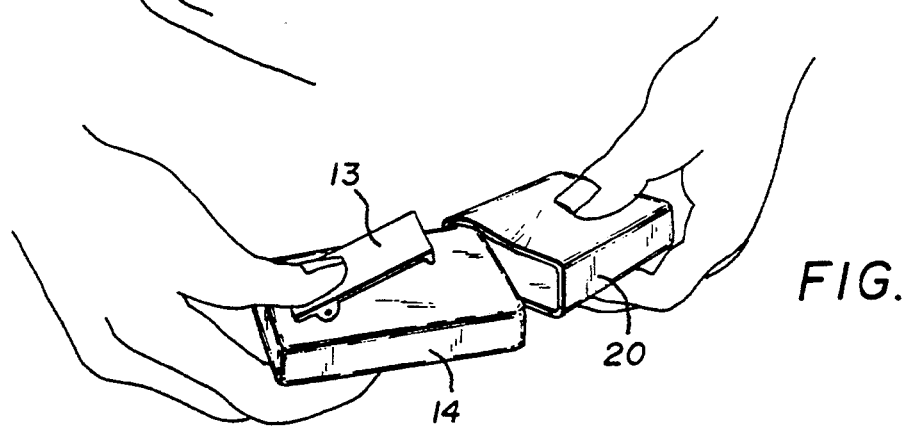
FIG. 7 is a perspective view of the holder of FIGS. 1–6 and device of FIGS. 1–5 in the hands of a user who is starting to place the holder onto the pager device.
Figure 8:
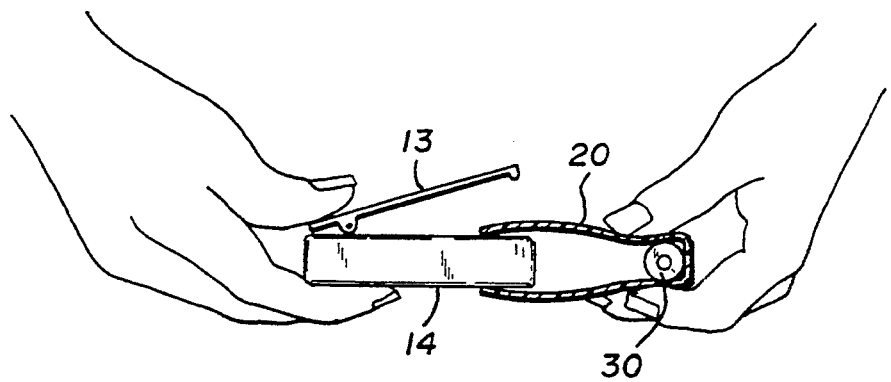
FIG. 8 is a perspective view similar to that of FIG. 7 in a later stage of placing the holder onto the pager device and with the pager shown in sections.

The assembly of the holder 20 as to the pager device 14 is illustrated in FIGS. 7 and 9, wherein in FIG. 7 the pager's cover is inserted into holder 20 and in FIG. 8 the holder 20 is pushed onto the pager 14. As illustrated in FIG. 8, the flexible nature of the holder 20 spreads the walls so that on assembly only a friction of front edges against the pager housing need be overcome.

It should now be appreciated that a back-up or spare battery holder has been described which is easy to use, is not prone to accident loss of the back-up battery, and is comfortable to wear or carry. While described in connection with one specific pager unit, the present invention may be adapted to many other such units and its principles applied to new such units as are hereafter available.

While one particular embodiment of the invention has been shown and described, it will be obvious to those in the art that changes and modifications may be made without departing from the invention and, therefore, the aim in the appended claims is to cover all such changes and modifications as fall within the true spirit and scope of the invention.

I claim:

1. A spare battery holder for a portable battery operational pager device of the type enclosed in a housing having a lower portion, which pager device can be releasably carried in the pocket attached to the clothing of a user, said holder comprising:

a sleeve of rubber-like elastic sheet material sized and shaped to fit over the housing and engage the lower portion of the pager housing with sufficient attachment so as to not pull or fall off from the housing during normal wear or use but being capable of easy manual removal therefrom by a user, said sleeve extending below the pager and forming a pocket for holding a spare battery, whereby the pager may be used or worn with the spare battery holder attached carrying a spare battery and when desired the holder easily removed from the housing and when desired the spare battery easily removed from the pocket.

2. The spare battery holder according to claim 1, wherein said pocket is formed by a bottom wall spanning across the bottom of the sleeve and formed unitarily therewith of said rubber-like material.

3. The spare battery holder according to claim 2, wherein the pager has a bottom surface sized slightly larger in width and length than the spare battery.

4. The spare battery holder according to claim 3, wherein said sleeve is of such a length as to enable it to hold two spare batteries and still surround the lower portion of the pager's housing with sufficient attachment when holding two spare batteries, so as to not come free from the housing during normal use and wear of the pager by a user.

5. A holder for a spare battery for a pager or beeper of the type that has a bottom slightly larger in the overall dimensions of the spare battery and approximately parallel sidewalls extending above the bottom, comprising:

a unitary body of flexible resilient rubber-like material sized and shaped to fit over the bottom of the pager and having side walls forming a sleeve which can extend from the bottom of the holder to and over the lower portion side walls of the pager or beeper such that the bottom portion of the pager or beeper is closely enclosed by the upper part of the holder and which is large enough to allow at least one battery to be held within the holder, with the battery sandwiched between the bottom of the holder and the bottom of the pager.

6. The holder of claim 5 wherein the rubber material is silicone rubber and the walls are of the order of 0.05 inch in thickness.

7. The holder of claim 6 wherein the beeper or pager is approximately rectilinear in shape and the holder is conformingly also rectilinear in shape.

8. In combination, a holder, a spare AA or like elongated battery, and a pager or beeper that employs such a battery and has a housing with a bottom sized in length and width larger than the length and width of the battery, said holder comprising a resilient rubber-like band section encircling in a stretched state the lower portion of the housing above the bottom and means connected to the band section for holding the spare battery lengthwise adjacent to the bottom of the housing.

9. The combination of claim 8 wherein said means of said holder for holding the spare battery is a closed sleeve extension formed unitarily with the encircling band section and of the same material as said band section.

10. The combination of claim 9 wherein the holder is made of silicone rubber and conforms in shape to the lower portion of the housing of the pager or beeper.

11. The combination of claim 10 wherein said pager or beeper has a back side with a clip mounted thereon, with a portion which is biased toward the back side and wherein said band section of said holder extends between said clip portion and said back side.

* * * * *